UNITED STATES PATENT OFFICE.

JACOB A. LEVIN, OF CHICAGO, ILLINOIS.

BISCUIT OR FOOD PRODUCT.

1,054,695. Specification of Letters Patent. Patented Mar. 4, 1913.

No Drawing. Application filed June 24, 1912. Serial No. 705,403.

*To all whom it may concern:*

Be it known that I, JACOB A. LEVIN, a citizen of the United States, residing at Chicago, in the county of Cook and State of Illinois, have invented certain new and useful Improvements in Biscuit or Food Products, of which the following is a specification.

My invention relates to a new and improved biscuit or food product.

One of the objects of my invention is to provide a healthful, nourishing, and sanitary food product in the form of a loaf, biscuit or cake.

My biscuit is especially intended as a nourishing food for persons who are suffering with diabetes, or corpulency, as it does not contain any property, or material, that encourages the secretion of uric acid, or fatty tissue, and therefore, as a food for persons who are suffering from such diseases, it may be eaten in any quantity desired. It is capable of satisfying the hunger and contains all the qualities necessary for building up and sustaining the other functions and tissues of the body.

In the preparation of my biscuit I procure, pure rye bran, which is a by-product of the flouring mills in the process of making rye flour, or I may take the rye flour, commonly known as pumpernickel, which is a rather coarse rye flour, and sift it until most of the rye flour portion or starchy parts are sifted out of it, there being left only the real coarse parts, which may be called, rye bran. The last mentioned method results in a bran which contains somewhat more starch than the first mentioned method, but it is therefore, more nourishing and strengthening food than is procured by the other method, and in some instances it is permissible. The rye bran contains very little starch, and being rather laxative in its nature, it is eminently well suited for the purpose intended. The second step consists in regrinding the rye bran, thus provided, to a very fine impalpable flour.

In making up a batch of bread I use about the following proportions and include the following materials: seven ounces of the reground rye bran flour; I then take four ounces of nuts, of any of the following varieties; pecan, walnut, almonds, filbert, Brazil nut, cocoanut, or any kind of nuts that are oily and do not contain much starch. I grind these nuts into a fine flour, and then I take about one and one half ounces of poppy-seed. The poppy-seeds are also ground to a fine, powdery, flour and mixed with the other dry ingredients. The poppy-seeds furnish a certain amount of oil that will serve as shortening and in addition to its other properties it possesses great laxative effect. I then may take one half ounce of caraway-seed and grind them to a flour consistency. This ingredient is put in the mixture for the purpose of giving the biscuit a pleasant flavor and is, therefore, not essential but may be used if desired. To the above ingredients one teaspoonful of table salt and two teaspoonfuls of baking powder may be added, after which all of the ingredients are mixed together thoroughly and in a dry state. After the ingredients have been thus mixed, dry, in the manner stated, one pint of fresh milk and two eggs, beaten until they are light, and one ounce of melted butter, or oil, such as olive oil, or the like, may be added to the mixture, and when sweetening is desired I put in saccharin dissolved in a small quantity of water. The conglomerate mass, or dough, is then worked in the usual manner and formed into loaves or cakes that may be baked into a loaf, or formed into a biscuit. In either event, the loaf or cake should be made relatively thin so that they may become perfectly baked or dried throughout.

The above formula is well designed for a dry, well cooked biscuit, which when done, will last for a long period of time after being thoroughly baked, but if it is desired to make a more moist bread, which will not last for so long a period of time, I prefer to use three eggs in the above mixture, instead of the number specified and somewhat more butter and a little milk.

In the preparation of the sweetened water I use an ounce of powdered saccharin and dissolve it in about two quarts of hot water, of which a teaspoonful of the above, is sufficient to sweeten the batch specified.

My food product is healthful and strength giving, and is especially adapted for persons suffering with diabetes or corpulency, as it has a tendency to stop the injurious secretions and yet possess all of the nourishing qualities of food necessary to sustain the system.

While I have herein described specifically my composition of matter and the manner of preparing the same, I do not wish to be limited, in this respect, beyond the scope of the appended claim.

Having described my invention, and what I claim as new and desire to secure by Letters Patent of the United States is:

A new article of manufacture consisting of a coherent cake or biscuit composed of rye bran reground, nuts and poppy-seed, ground, thoroughly mixed dry into a homogenous mass, made into a dough and baked.

In testimony whereof I hereunto set my hand in the presence of two witnesses.

JACOB A. LEVIN.

In the presence of—
W. LINN ALLEN,
MARY F. ALLEN.